(12) United States Patent
Oesterheld et al.

(10) Patent No.: US 9,825,551 B2
(45) Date of Patent: Nov. 21, 2017

(54) CONVERTER AND ELECTRIC GENERATOR IN WHICH GROUPS OF WINDINGS ARE USED TO GENERATE OUTPUT VOLTAGES ACCORDING TO A POWER REQUIREMENT

(71) Applicant: General Electric Technology GmbH, Baden (CH)

(72) Inventors: Joerg Oesterheld, Oberrohrdorf (CH); Thierry Lecomte, Offemont (FR); René Wilhelm Schaefer, Suhr (CH)

(73) Assignee: General Electric Technology GmbH, Baden (CH)

( * ) Notice: Subject to any disclaimer, the term of this patent is extended or adjusted under 35 U.S.C. 154(b) by 1063 days.

(21) Appl. No.: 13/752,990

(22) Filed: Jan. 29, 2013

(65) Prior Publication Data

US 2013/0194849 A1 Aug. 1, 2013

(30) Foreign Application Priority Data

Jan. 31, 2012 (EP) .................................. 12290040

(51) Int. Cl.
| | |
|---|---|
| *H02M 7/155* | (2006.01) |
| *H02M 7/00* | (2006.01) |
| *H02K 19/34* | (2006.01) |
| *H02M 5/293* | (2006.01) |

(Continued)

(52) U.S. Cl.
CPC ............. *H02M 7/00* (2013.01); *H02K 19/34* (2013.01); *H02M 5/293* (2013.01); *H02M 7/49* (2013.01); *H02P 25/22* (2013.01)

(58) Field of Classification Search
CPC ............... H02K 3/28; H02K 3/46; H02K 3/48
USPC .......... 363/9–10, 36, 65, 123–126, 148–150, 363/152, 159–161; 219/78.01–120; 318/140–158; 310/179–180, 184–185, 310/11.12, 12.13, 102 R, 113
See application file for complete search history.

(56) References Cited

U.S. PATENT DOCUMENTS

| | | | | |
|---|---|---|---|---|
| 2,084,177 A | * | 6/1937 | Alexanderson et al. | ......... 440/6 |
| 2,123,945 A | * | 7/1938 | Henderson | ..................... 223/111 |
| 3,432,706 A | * | 3/1969 | Bering et al. | ................. 310/157 |

(Continued)

FOREIGN PATENT DOCUMENTS

| | | |
|---|---|---|
| DE | 2 106 146 | 8/1972 |
| DE | 11 2009 002 287 T5 | 9/2011 |

(Continued)

OTHER PUBLICATIONS

Office Action dated Dec. 4, 2013, by the German Patent Office in corresponding German Patent Application No. 10 2013 001 489.1. (8 pages).

*Primary Examiner* — Adolf Berhane
*Assistant Examiner* — Nusrat Quddus
(74) *Attorney, Agent, or Firm* — GE Global Patent Operation; Rita D. Vacca (57) ABSTRACT

The converter includes a plurality of input lines and one or more output lines. Each input line is connected to a group of supply circuits and the supply circuits of each group are connected to different output lines. The electric generator comprises a stator and a rotor. The stator has a plurality of windings. Each winding has a plurality of phases. Each phase comprises bars connected in series. The phases have a first connection at one end, a second connection at the other end and a third connection in an intermediate position between the first and the second connection.

3 Claims, 6 Drawing Sheets

(51) Int. Cl.
*H02M 7/49* (2007.01)
*H02P 25/22* (2006.01)

(56) References Cited

U.S. PATENT DOCUMENTS

| | | | | |
|---|---|---|---|---|
| 3,702,429 A | * | 11/1972 | Sawyer et al. | 318/800 |
| 3,739,213 A | * | 6/1973 | Willyoung | H02K 3/28 |
| | | | | 310/198 |
| 4,246,532 A | * | 1/1981 | Kubo | H02K 19/16 |
| | | | | 322/89 |
| 4,307,311 A | * | 12/1981 | Grozinger | 310/179 |
| 4,719,560 A | * | 1/1988 | Ford | H02K 47/30 |
| | | | | 310/161 |
| 5,214,371 A | * | 5/1993 | Naidu | H02J 7/1492 |
| | | | | 322/28 |
| 6,018,200 A | * | 1/2000 | Anderson et al. | 290/40 B |
| 6,236,580 B1 | | 5/2001 | Aiello et al. | |
| 6,333,622 B1 | * | 12/2001 | Fogarty | H02P 9/08 |
| | | | | 322/59 |
| 6,940,202 B1 | * | 9/2005 | Chen et al. | 310/184 |
| 8,072,190 B2 | * | 12/2011 | Tormanen | H02M 1/126 |
| | | | | 310/189 |
| 8,976,555 B2 | * | 3/2015 | Oesterheld et al. | 363/65 |
| 2003/0043603 A1 | | 3/2003 | Schreiber | |
| 2005/0029890 A1 | * | 2/2005 | Kadoya et al. | 310/180 |
| 2006/0273766 A1 | * | 12/2006 | Kawamura | H02K 3/28 |
| | | | | 322/46 |
| 2008/0055953 A1 | * | 3/2008 | Lacaze | 363/152 |
| 2008/0079400 A1 | * | 4/2008 | Lacaze | H02K 3/28 |
| | | | | 322/20 |
| 2008/0218320 A1 | | 9/2008 | Jang | |
| 2008/0290845 A1 | * | 11/2008 | Holveck et al. | 323/214 |
| 2010/0072824 A1 | | 3/2010 | Abolhassani et al. | |
| 2010/0073970 A1 | | 3/2010 | Abolhassani et al. | |
| 2011/0013428 A1 | | 1/2011 | Abolhassani et al. | |
| 2012/0182774 A1 | * | 7/2012 | Boecker et al. | 363/95 |
| 2013/0033205 A1 | * | 2/2013 | Furukawa | H02P 21/0003 |
| | | | | 318/400.02 |

FOREIGN PATENT DOCUMENTS

| | | |
|---|---|---|
| EP | 1416604 A2 | 5/2004 |
| EP | 1976105 A1 | 10/2008 |
| EP | 2157687 A1 | 2/2010 |
| EP | 2270968 A1 | 1/2011 |
| WO | 2010058028 A2 | 5/2010 |

* cited by examiner

CONVERTER AND ELECTRIC GENERATOR IN WHICH GROUPS OF WINDINGS ARE USED TO GENERATE OUTPUT VOLTAGES ACCORDING TO A POWER REQUIREMENT

INCORPORATION BY REFERENCE

The following documents are incorporated herein by reference as if fully set forth: European Patent Application No. 12290040.0, filed Jan. 31, 2012.

FIELD OF THE INVENTION

The present description relates to a converter and an electric generator.

BACKGROUND

In order to convert an input voltage with a frequency f1 into an output voltage with a frequency f2 multilevel converter can be used.

Figures 1A, 1B:
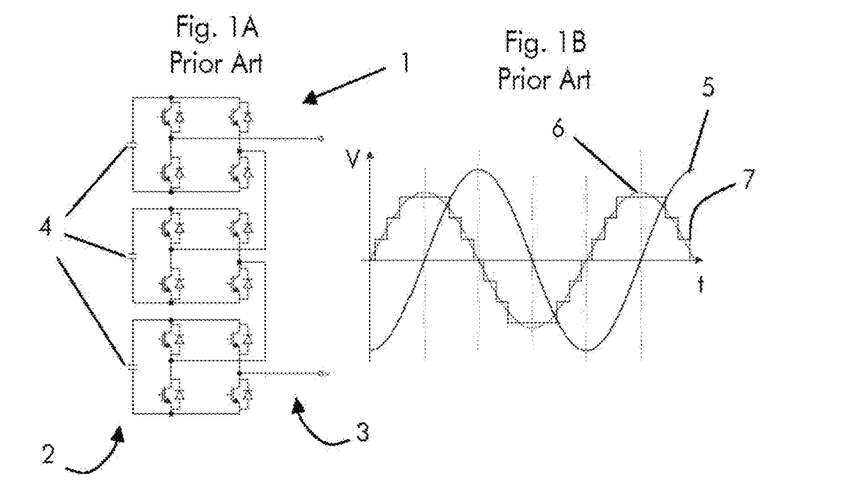
FIG. 1A is an electric scheme of a known multilevel converter.
FIG. 1B shows the voltage combination implemented by the multilevel converter of FIG. 1A.

With reference to FIG. 1A, a multilevel converter 1 has inputs 2, outputs 3 and capacitors 4 between the inputs 2; all the capacitors 4 have the same capacitance. The capacitors 4 are used to divide the input voltage in steps that are then combined to create a desired sinusoidal step modulated output voltage; in FIG. 1B reference 5 indicates the grid voltage, reference 6 indicates the desired voltage and reference 7 indicates the output voltage considering a connection to the grid via an impedance (reactor or transformer).

When the capacitors 4 have different capacitance (also small differences can be relevant and could for example be due to defecting manufacturing or connections) the voltage steps are different from one another and the control of the output voltage can become problematic, because it would need a sophisticated control of the voltage distribution between the capacitors.

SUMMARY

The present disclosure is directed to a converter including a plurality of input lines and a plurality of output lines. Each input line is connected to a group of supply circuits and the supply circuits of each group are connected to different output lines.

In another aspect, the present disclosure is directed to an electric generator including a stator and a rotor. The stator includes a plurality of windings and each winding includes a plurality of phases. Each phase includes at least two bars and each phase also includes a first connection and a second connection and at least one third connection in an intermediate position between the first connection and the second connection.

According to a further aspect, the present disclosure is directed to an arrangement of an electric generator and a converter, the electric generator having a stator and a rotor. The stator includes a plurality of windings, each winding including a plurality of phases with each phase having at least two bars. Each phase also having a first connection and a second connection. The converter includes a plurality of input lines and a plurality of output lines and each phase includes at least one connection in an intermediate position between the first connection and the second connection to define a first bar group and a second bar group. Each input line of the converter is connected to a group of supply circuits and the supply circuits of each group are connected to different output lines. A first winding group of the generator is connected to a first input line; the first winding group including bars of the first bar groups of at least a multi-phase winding. A second winding group of the generator is connected to a second input line, the second winding group including bars of the first bar groups of at least a multi-phase windings. A third winding group is connected to a third input line; the third winding group includes bars of the second bar groups of at least a multi-phase windings.

BRIEF DESCRIPTION OF THE DRAWINGS

Further characteristics and advantages will be more apparent from the description of a preferred but non-exclusive embodiment of the converter and electric generator illustrated by way of a non-limiting example in the accompanying drawings, in which.

DETAILED DESCRIPTION OF PREFERRED EMBODIMENTS

Introduction to the Embodiments

An aspect of the present description is thus to provide a converter and an electric generator by which the control of the output voltage can be simplified, such that it is easier than with existing converters.

This and further aspects are attained by providing a converter and an electric generator in accordance with the accompanying claims.

DETAILED DESCRIPTION

Converter

In the following the converter 10 is described first. The converter 10 (FIG. 2) comprises a plurality of input lines 11 and one or more output lines 12a, 12b, 12c. Each input line 11 is connected to a group 13 of supply circuits 14. The supply circuits 14 of each group 13 are in turn connected to different output lines 12a, 12b, 12c.

Figure 2:
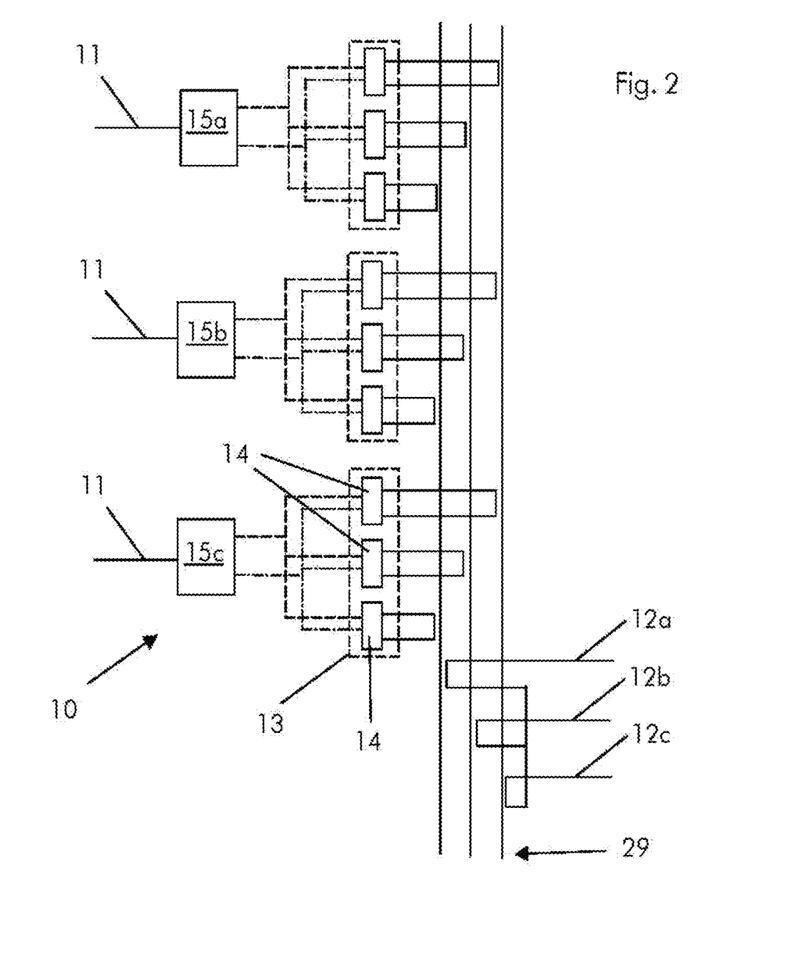
FIG. 2 is an electric scheme of a converter.

Preferably, each output line 12a, 12b, 12c is connected to one supply circuit 14 of each group 13; in other words each of the groups 13 includes a number of supply circuits 14 equal to the number of output lines 12a, 12b, 12c and each of these supply circuits 14 is connected to one output line 12a, 12b, 12c.

The supply circuits 14 are arranged to supply the output lines 12a, 12b, 12c with a positive voltage or a negative voltage or a zero voltage.

The converter 10 can also have input converters (input converters 15a, 15b, 15c operating as rectifiers in one energy direction only or as converters operating in two energy directions) or rectifiers 15a, 15b, 15c on each input line 11. The input converters or rectifiers are advantageous (but not mandatory) when the converter 10 (i.e. its input lines 11) is fed with an AC voltage. In the following particular reference to a rectifier is made, but it is clear that the term rectifier includes embodiments in which the rectifier can provide energy in two directions, such that in one direction it operates as a rectifier and in the other direction it operates as an inverter; these devices are well known in the art.

Figure 5:
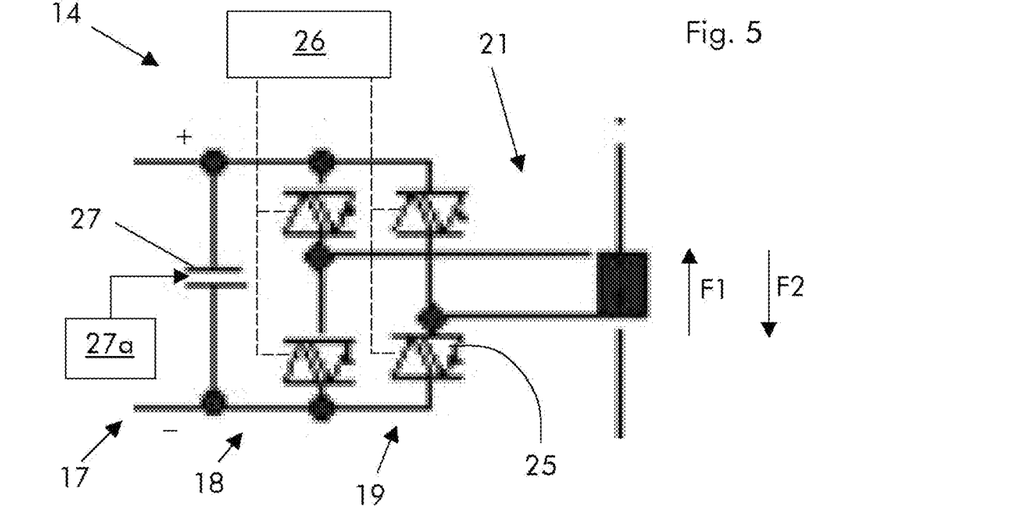
FIGS. 5 through 7 show electric schemes of a converter supply circuit.
Figure 6:
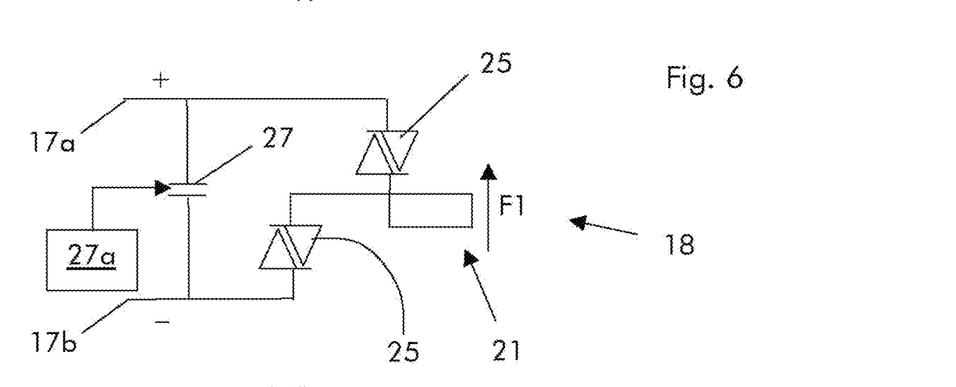
Figure 7:
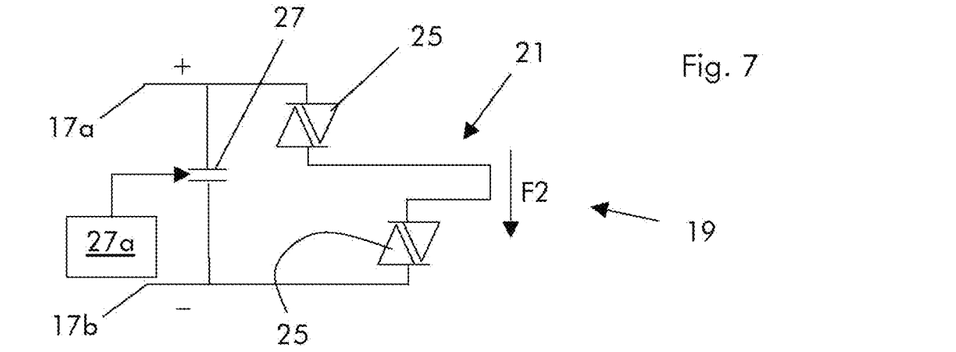

The supply circuits 14 (see FIG. 5) have an input 17 (preferably a DC input) and a first and a second branch 18, 19; for clarity FIGS. 6 and 7 show the two branches 18 and 19 separately; namely FIG. 6 shows the branch 18 and FIG. 7 shows the branch 19.

The branches 18, 19 are both connected to the input 17 and have a common part 21 that is coupled to an output line 12a, 12b, 12c.

The first and second branches 18, 19 have components 25 that allow selection of the current direction through the common part 21 or selection of the voltage that can be supplied to the output line.

These components can non-exclusively be thyristors and/or thyristors with switch-off capacitors and diode/reactor oscillating circuits and/or IGBT and/or IGCT and/or GTO in a bidirectional configuration (or other bidirectional switching devices) and are connected to drive circuits 26.

In addition, a capacitor 27 is connected between the connections 17a (+), 17b (−) of the input 17; this capacitor 27 is used to define the voltage steps of the output voltage and to store energy in the dc-link for reactive power control. Preferably the capacitors 27 are charged using separate charging devices 27a.

In a preferred embodiment, between the supply circuits 14 and the output lines 12a, 12b, 12c a transformer 29 (see FIG. 2) is provided and the connection between the supply circuits 14 and output lines 12a, 12b, 12c occurs via this transformer 29. This transformer 29 can have secondary windings insulated from one another.

The operation of the converter in the embodiment described is the following.

The operation is described with reference to the converter of FIG. 2, supposing that the input lines 11 are connected to AC voltage sources and that the voltage supplied to each input line 11 is different from the voltage supplied to the other input lines. In the present example the voltage supplied via a first line is 1 time V (1V, downstream of the rectifier 15a), the voltage supplied via the second line is 3 times V (3V, downstream of the rectifier 15b) and the voltage supplied via the third line is 8 times V (8V, downstream of the rectifier 15c); thus here and in the following 1V, 3V and 8V indicate that the voltage is 1 time, 3 times or 8 times a voltage V; typically the voltage is in the order to thousands of Volt.

The voltages above defined can in different examples be achieved by a dedicated generator having outputs providing different voltages or a traditional generator whose outputs provide the same voltage (for example a usual three phase generator) but with a transformer connected at its outputs (all of the outputs or only some of them according to the needs) to obtain the desired voltages.

Naturally, instead of 8V-3V-1V, other combinations are feasible, for example 25V-8V-3V-1V to generate an output voltage with +/−37 voltage steps using the 4 input voltages 1 Vac/1 Vdc, 3 Vac/3 Vdc, 8 Vac/8 Vdc and 25 Vac/25 Vdc, and so on.

Of course, instead of different voltages at each input line 11, the voltage at the input lines 11 can also be the same.

The AC voltage supplied to each input line 11 is rectified by the rectifiers 15a, 15b, 15c, such that at the inputs 17 of the supply circuits 14 a DC voltage is provided.

The two branches 18, 19 of the supply circuits 14 are arranged to allow current flow through the common part 21 in a different direction according to the needs.

Namely, assuming that at the connection 17a a positive voltage is provided and at the connection 17b a negative voltage is provided, a current flow in a direction F1 can be achieved by activating the branch 18 (FIG. 6) and a current flow in the opposite direction F2 can be achieved by activating the branch 19 (FIG. 7). Each branch can be activated by opportunely driving the components 25. Naturally the components 25 can also be driven to prevent any current flow through the common part 21.

If no rectifier 15a, 15b, 15c is provided upstream of the supply circuits 14, the components 14 could also be driven such that they control the current flow through the common part 21 independently of the positive or negative voltage at the input 17. In other words, the drive circuit 26 can activate the first or second branch and can allow the flow of the current in the required direction as a function of the voltage at the connections 17a, 17b. Thus, also in this case, by appropriately driving the components 25 via the drive circuits 26 it is possible to have a current through the common part 21 in any of the desired direction (for example to generate reactive power versus the grid only) or no current.

Preferably all the supply circuits 14 of each group 13 are driven in parallel but with a delay, such that at each output line 12a, 12b, 12c the same voltage signal is obtained but these signals are out of phase, to achieve a three phase (or also less or more phases if needed) output.

By appropriately driving all the supply circuits 14 of all the groups 13 it is possible to build the desired output voltage.

In fact, when the supply circuits 14 are operated in parallel, each group 13 of circuits 14 can inject in the output lines 12a, 12b, 12c a voltage originating from the corresponding input line.

In particular an embodiment of converter whose supply circuits 14 can supply different voltages (for example ±1V (i.e. 1 times V), ±3V (i.e. 3 times V), ±8V (i.e. 8 times V) or 0 voltage (i.e. 0 times V) can build an output voltage in a broader range than when all the input lines have the same voltage.

The output voltage at each of the output lines 12a, 12b, 12c is the combination (arithmetic sum) of the voltages injected by each group 13.

Figure 3:
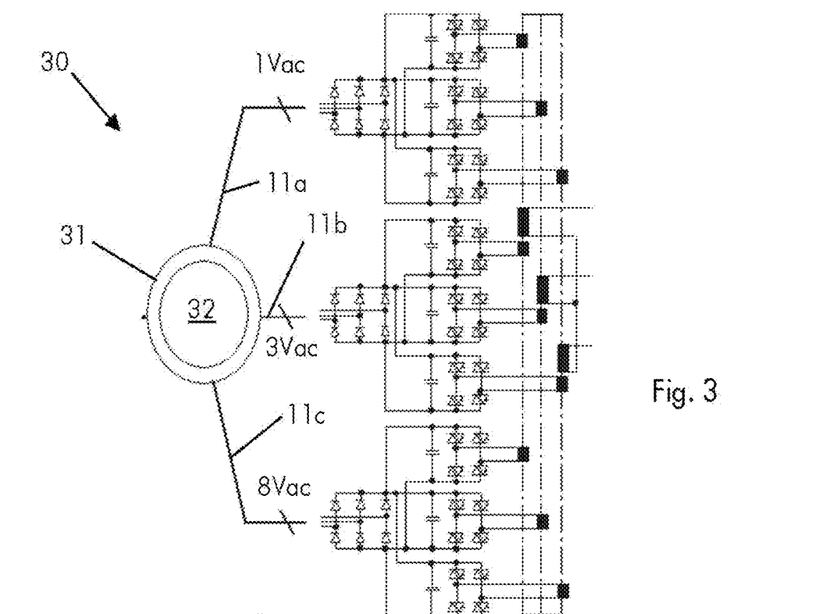
FIG. 3 is a schematic view of a converter connected to an electric generator.

In particular the group 13 connected to the input line 11a of FIG. 3 at voltage 1V (downstream of the rectifier 15a) can inject into the output lines 12a, 12b, 12c:

0 voltage;

voltage +1V;

voltage −1V.

Likewise the group 13 connected to the input line 11*b* of FIG. 3 at voltage 3V (downstream of the rectifier 15*b*) can inject into the output lines 12*a*, 12*b*, 12*c*:
- 0 voltage;
- voltage +3V;
- voltage −3V.

The group 13 connected to the input line 11*c* of FIG. 3 at voltage 8V (downstream of the rectifier 15*c*) can inject into the output lines 12*a*, 12*b*, 12*c*:
- 0 voltage;
- voltage +8V;
- voltage −8V.

Figure 8:
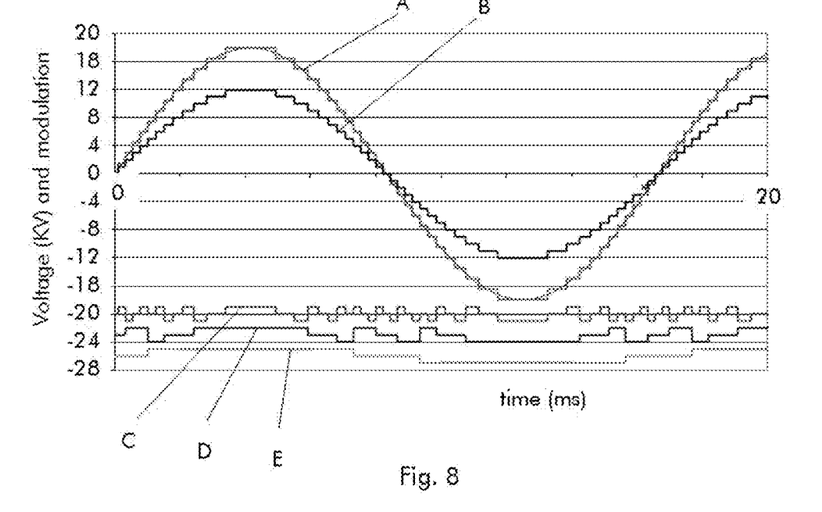
FIGS. 8 and 9 show the voltage combination implemented via the converter.
Figure 9:
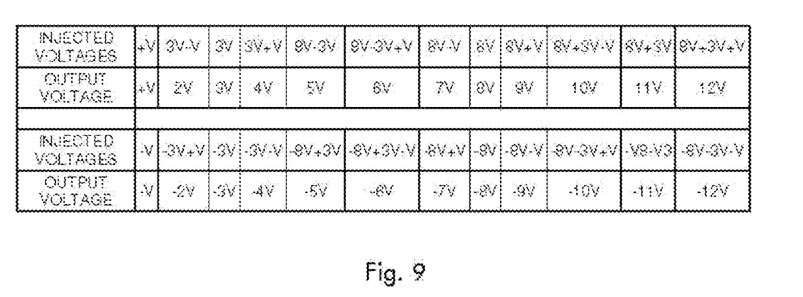

From the combination of these voltages each voltage between 0 and ±12 times V can be achieved; for example FIG. 9 shows a table of the possible voltage combinations to achieve the desired output voltages and FIG. 8 shows an example of an output voltage that can be obtained by combining the voltages from each group 13. In this Figure reference A indicates the output voltage and reference B indicates the voltage steps (−12 . . . +12) and reference C, D, E indicate the actual status of the groups 1V, 3V and 8V (+nV; 0; −nV; n=1, 3 or 8).

The amplitude of the output voltage A in FIG. 8 can be controlled by excitation of the generator or by pulse width modulation of the supply circuits 14 or by phase angle control of the rectifiers 15*a*, 15*b*, 15*c* (implemented by input converters with for example thyristors instead of diodes) or by forced commutated rectifiers 15*a*, 15*b*, 15*c* (in this case input converters are used with GTO, IGBT, IGCT instead diodes) or by combination of these methods.

Electric Generator

The voltage needed at the input lines 11 of the converter 10 can be advantageously provided by an electric generator 30.

Figure 10:
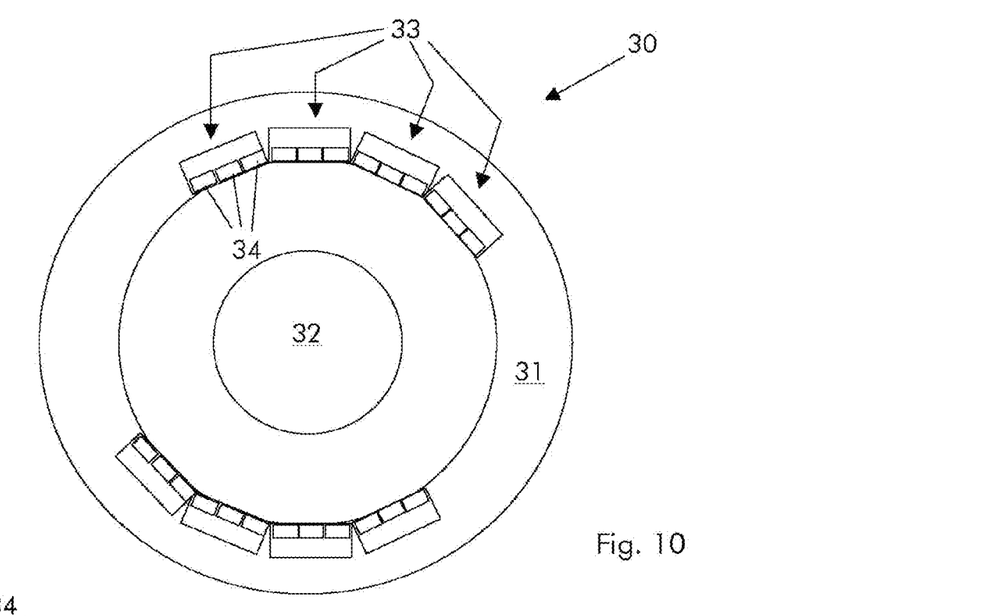
FIG. 10 is a schematic view of an electric generator (or motor)

The electric generator 30 comprises a stator 31 and a rotor 32.

The stator 31 has a plurality of windings 33 and each winding 33 has a plurality of phases 34 (the example shows a generator with four three-phase windings).

Figure 11:
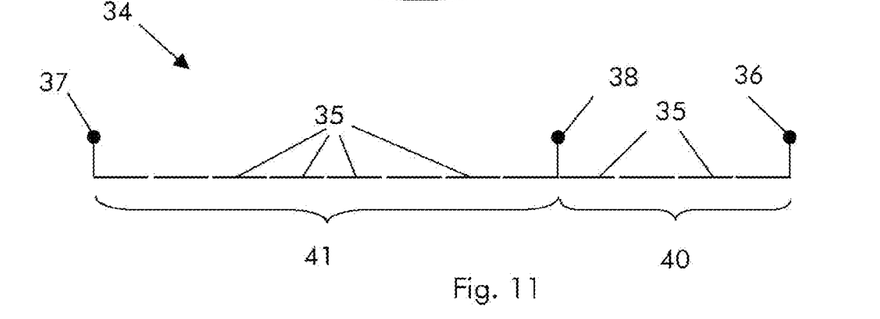
FIG. 11 is a schematic view of one generator (or motor) phase.

Each phase 34 comprises two or more than two bars 35; the bars 35 are connected in series to define a bar series.

Each phase 34 has a first connection 36 at one end and a second connection 37 at the other end thereof.

In addition, the phases 34 also have at least a connection 38 (for example a third connection) in an intermediate position between the first and the second connection 36, 37.

Preferably, the intermediate connection 38 defines:
a first bar group 40 including ⅓ of the total number of bars (to generate the ac voltage 1 Vac), and
a second bar group 41 including ⅔ of the total number of bars (to generate the ac voltage 2 Vac).

Naturally, the first bar group 40 and second bar group 41 can include a different number of bars according to the needs and particular design.

In the example shown (see FIG. 11), each phase 34 includes twelve bars 35, the first group 40 includes four bars 35 and the second group 41 includes eight bars 35.

In particular, if the voltage at the connection 36 is 1 Vac, the voltage at the connection 37 is 2 Vac (Vac means alternating voltage). The connections 38 can be star connected.

Advantageously the connections 36, 37, 38 are three phase (or in general multi phase) connections.

Arrangement of an Electric Generator and a Converter

Figure 4A:
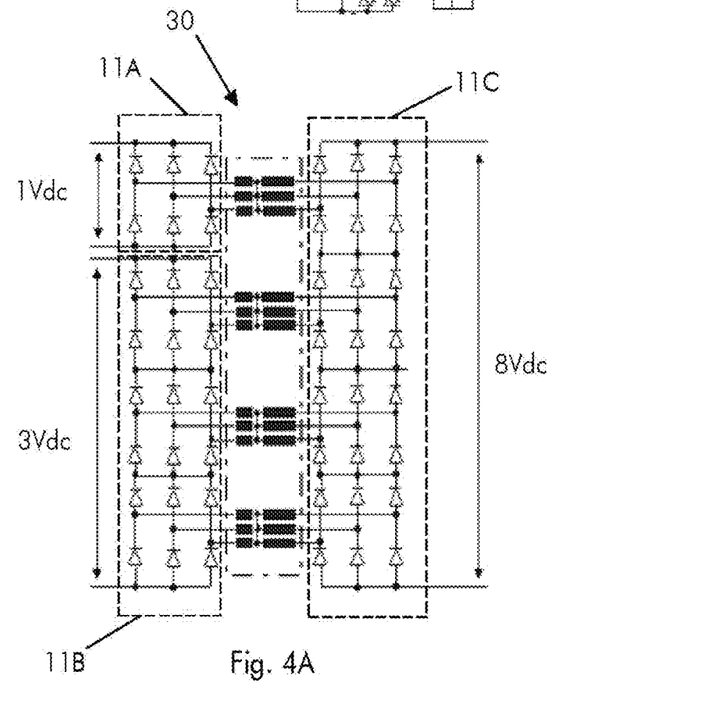
FIG. 4A is an electric scheme of an electric generator.

The electric generator 30 is particularly arranged to be connected to the converter 10 to define an arrangement in which:

a first winding group 45 of the generator 30 is connected to the input line 11*a*; in the example of the Figures the winding group 45 includes the groups of bars 40 of one multi-phase (three-phase) winding 33. The connection can be done via the converter 15*a* to achieve a dc input voltage 1 Vdc, a second winding group 46 of the generator connected to the input line 11*b*; in the example of the Figures the winding group 46 includes the groups of bars 40 of the other three multi-phase (three-phase) windings 33. The connection can be done for example via the converter 15*b* to achieve a dc input voltage 3 Vdc, a third winding group 47 of the generator is connected to the input line 11*c*; in the example of the Figures the winding group 47 includes the groups of bars 41 of all four multi-phase (three-phase) windings 33. The connection can be done for example via the converter 15*c* to achieve a dc input voltage 8 Vdc.

It is nonetheless clear that in different embodiments the group of windings 45 can include one or more groups of bars 40, the group of windings 46 can include one or more groups of bars 40, and the group of windings 47 can include one or more groups of bars 41 according to the needs.

Figure 4B:
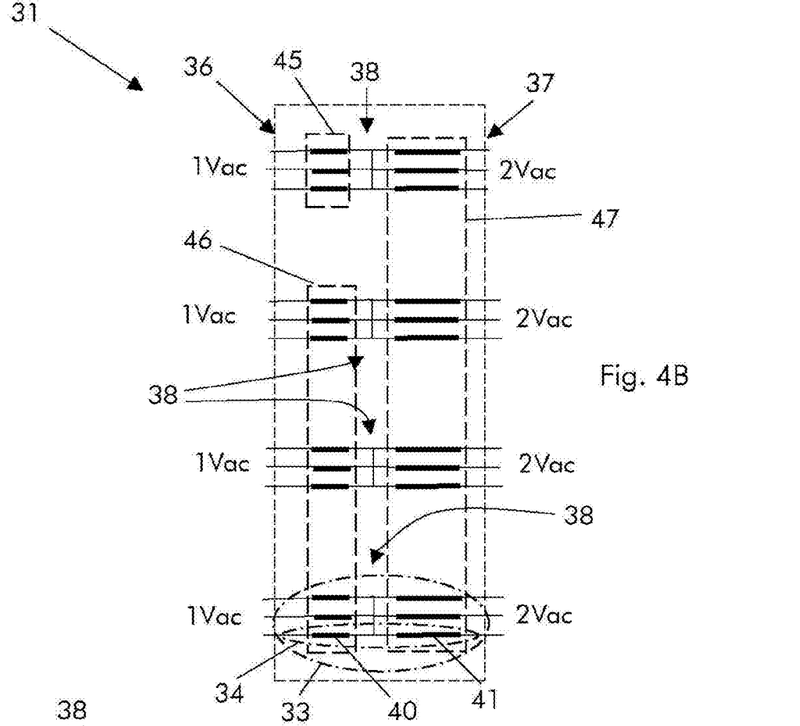
FIG. 4B is an enlarged part of FIG. 4A in an embodiment of the electric generator.
Figure 4C:
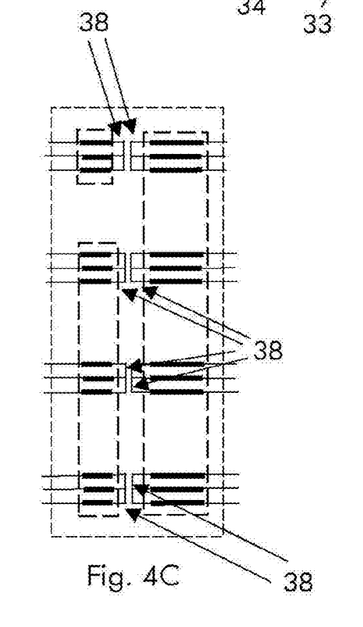
FIG. 4C is an alternative solution to the solution of FIG. 4B.
Figure 4D:
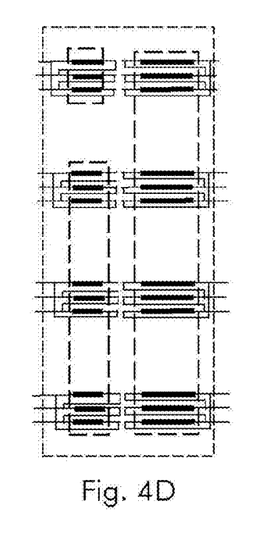
FIG. 4D is a further alternative solution to the solution of FIGS. 4B and 4C.

The transformer 29 can have secondary windings insulated from one another, the generator winding can then be designed as shown in FIG. 4B. If no transformer 29 is used, the generator 30 can have one of the two connections 38 that are star point connected on each phase 34 (FIG. 4C) or it can have a delta connection on each 3-phase system (FIG. 4D).

Power Plant

Figure 12:
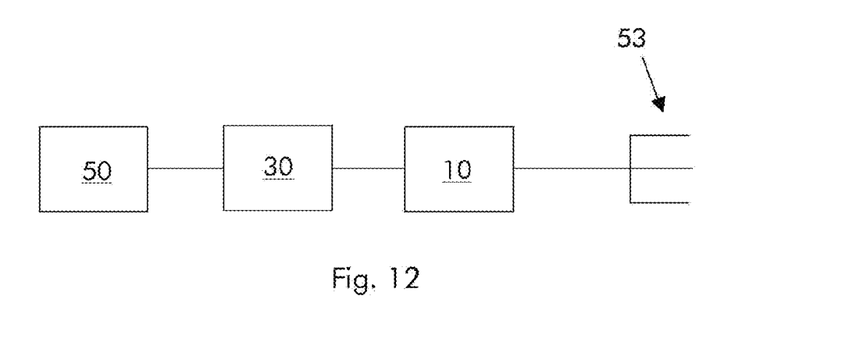
FIG. 12 is a schematic view of a power plant.

The arrangement described can be implemented in a power plant such as the power plant schematically shown in FIG. 12.

This power plant has an engine 50 such as a gas or steam turbine connected to an electric generator such as the electric generator 30 above described. The electric generator 30 is connected to the converter 10 that in turn is connected to an electric grid 53.

Two modes of operation are possible for this power plant:

normal operation, with the engine 50 that activates the generator 30 that supplies electric power to the converter 10; the converter converts the electric power received by the generator to adapt it to the grid 53 and supplies it to the grid 53;

start up, in which the grid supplies electric power to the converter that adapts the electric power to the features such as frequency needed by the generator for it to operate as an electric motor; the generator operating as an electric motor activates the engine 50.

The arrangement of the generator 30 and converter 10 is particularly advantageous during start up, because during start up only a limited power is usually needed from the grid to activate the generator 30 operating as a motor; in this case only some of the groups 45, 46, 47 of windings can be used according to the needs. For example only the group 45 or 46 or 47 or combination of two of them can be used; it is clear that when more power is needed also all the groups 45-47 of windings can be advantageously used.

If the group of windings 45 together with the rectifier 15*a* is used only for start-up, the rectifier 15*a* is designed with thyristors, IGBT, IGCT or GTO to operate in both energy directions (input converter). The other rectifiers 15*b* and 15*c* can be designed with diodes only (because only one energy direction is used). If the other groups are also used for start-up, the rectifiers 15*b* and 15*c* are designed with IGBT, IGCT or GTO thyristors (input converter) because two energy directions are used.

REFERENCE NUMBERS 1 multilevel converter
2 input
3 output
4 capacitors
5 input voltage
6 desired voltage
7 output voltage
10 converter
11, 11a, 11b, 11c input lines
12a, 12b, 12c output lines
13 group of supply circuits
14 supply circuit
15a, 15b, 15c rectifiers/input converters
17 input
17a, 17b connections
18 branch
19 branch
21 common part
25 components
26 drive circuits
27 capacitors
27a separate charging devices
29 transformer
30 electric generator
31 stator
32 rotor
33 windings
34 phases
36 first connection
37 second connection
38 third connection
40 group of bars
41 group of bars
45 group of windings
46 group of windings
47 group of windings
50 engine
53 grid
F1, F2 current direction
A output voltage
B voltage steps
C, D, E actual status of the groups 1V, 3V and 8V (+nV; 0; −nV; n=1, 3 or 8)

What is claimed is:

1. An electric generator comprising:
a stator comprising a plurality of windings, each winding of the plurality of windings comprising a plurality of phases, each phase of the plurality of phases comprising at least two bars connected in a bar series, each phase further comprising a first voltage connection, a second voltage connection, and at least one third voltage connection in a position between the first voltage connection and the second voltage connection, with the first voltage connection at a first end of each phase, the second voltage connection at a second end of each phase, and
the at least one third voltage connection is an intermediate connection that divides the bar series into a first bar group and a second bar group;
a rotor; and
a converter comprising a plurality of input lines and a plurality of output lines, with each input line of the plurality of input lines connected to a group of voltage supply circuits, and the voltage supply circuits of each group connected to different output lines,
wherein a first winding group of the generator includes bars of the first bar group of a multi-phase winding and is connected to a first input line, a second winding group of the generator includes bars of the first bar group of a first group of multi-phase windings and is connected to a second input line, and a third winding group of the generator includes bars of the second bar group of a second group of multi-phase windings and is connected to a third input line.

2. An arrangement of an electric generator and a converter, the electric generator comprising a stator and a rotor, wherein the stator comprises a plurality of windings, each winding comprises a plurality of phases, each phase comprising at least two bars for generating an ac voltage, each phase further comprising a first voltage connection and a second voltage connection; and
the converter comprises a plurality of input lines and a plurality of output lines, and each phase comprises at least one voltage connection between the first voltage connection and the second voltage connection to define a first bar group for generating a first ac voltage and a second bar group for generating a second ac voltage; and each input line of the converter is connected to a group of voltage supply circuits and the voltage supply circuits of each group are connected to different output lines,
wherein a first winding group of the generator is connected to a first input line; the first winding group including bars of the first bar groups of a multi-phase winding, a second winding group of the generator is connected to a second input line; the second winding group including bars of the first bar groups of a first group of multi-phase windings, a third winding group connected to a third input line; the third winding group including bars of the second bar groups of a second group of multi-phase windings.

3. The arrangement according to claim 2, wherein the generator includes four multi-phase windings, the first winding group includes bars of the first bar group of one multi-phase winding, the second winding group includes bars of the first bar groups of three multi-phase windings different from the multi-phase windings of the first winding group, the third winding group includes bars of the second bar groups of all four multi-phase windings.

* * * * *